(12) United States Patent
Naik et al.

(10) Patent No.: US 11,692,709 B2
(45) Date of Patent: Jul. 4, 2023

(54) GAS TURBINE FUEL MIXER COMPRISING A PLURALITY OF MINI TUBES FOR GENERATING A FUEL-AIR MIXTURE

(71) Applicant: General Electric Company, Schenectady, NY (US)

(72) Inventors: Pradeep Naik, Karnataka (IN); Manampathy G. Giridharan, Mason, OH (US); Vishal Sanjay Kediya, Karnataka (IN); Gregory A. Boardman, Liberty Township, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/199,257

(22) Filed: Mar. 11, 2021

(65) Prior Publication Data

US 2022/0290863 A1    Sep. 15, 2022

(51) Int. Cl.
*F23R 3/28* (2006.01)
*F23R 3/12* (2006.01)
*F23R 3/34* (2006.01)
*F02C 7/22* (2006.01)

(52) U.S. Cl.
CPC ........... *F23R 3/286* (2013.01); *F23R 3/12* (2013.01); *F23R 3/343* (2013.01); *F02C 7/222* (2013.01)

(58) Field of Classification Search
CPC ............. F23R 3/12; F23R 3/286; F23R 3/343
See application file for complete search history.

(56) References Cited

U.S. PATENT DOCUMENTS

| | | | |
|---|---|---|---|
| 5,836,164 A | 11/1998 | Tsukahara et al. | |
| 6,889,495 B2 | 5/2005 | Hayashi et al. | |
| 8,205,452 B2 * | 6/2012 | Boardman | F23R 3/283 60/737 |
| 8,683,804 B2 * | 4/2014 | Boardman | F23R 3/286 60/737 |
| 9,528,444 B2 * | 12/2016 | Westmoreland | F02C 7/22 |
| 9,651,259 B2 * | 5/2017 | Boardman | F23R 3/286 |
| 10,641,176 B2 | 5/2020 | Berry et al. | |
| 10,690,056 B2 | 6/2020 | Berry et al. | |
| 10,935,245 B2 * | 3/2021 | Boardman | F02C 7/22 |
| 11,156,361 B2 * | 10/2021 | Boardman | F23R 3/283 |

(Continued)

FOREIGN PATENT DOCUMENTS

| | | |
|---|---|---|
| EP | 2957367 B1 | 12/2018 |
| WO | 2013065624 A1 | 5/2013 |

*Primary Examiner* — William H Rodriguez
(74) *Attorney, Agent, or Firm* — Venable LLP; Elizabeth C. G. Gitlin; Michele V. Frank

(57) ABSTRACT

A mixer for blending fuel and air in a combustor of a turbine engine. The mixer includes a central body having a central passageway and a central axis. The mixer includes a plurality of tubes positioned radially around the central axis and circumferentially around a periphery of the mixer. Each of the tubes of the mixer includes opposed openings and a tangential opening. Each of the tubes of the mixer includes a cylindrical interior mixing passage configured to receive air flow from the opposed openings and the tangential opening and a fuel flow. The opposed openings are configured to spread the fuel flow laterally and the tangential opening is configured to spread the fuel flow tangentially.

20 Claims, 9 Drawing Sheets

(56) References Cited

U.S. PATENT DOCUMENTS

| | | | |
|---|---|---|---|
| 2011/0016866 A1* | 1/2011 | Boardman | F23R 3/36 |
| | | | 60/730 |
| 2011/0113783 A1* | 5/2011 | Boardman | F23R 3/286 |
| | | | 60/737 |
| 2011/0252803 A1 | 10/2011 | Subramanian et al. | |
| 2012/0180487 A1* | 7/2012 | Uhm | F23R 3/286 |
| | | | 60/737 |
| 2014/0083102 A1 | 3/2014 | Miura et al. | |
| 2014/0109582 A1 | 4/2014 | Shershnyov et al. | |
| 2015/0167983 A1* | 6/2015 | McConnaughhay | F02C 7/222 |
| | | | 239/408 |
| 2015/0241064 A1* | 8/2015 | Boardman | F23R 3/10 |
| | | | 60/737 |
| 2018/0128489 A1* | 5/2018 | Boardman | F23R 3/10 |
| 2018/0128491 A1* | 5/2018 | Boardman | F23R 3/04 |
| 2018/0128492 A1 | 5/2018 | Boardman et al. | |
| 2018/0142894 A1 | 5/2018 | Stytsenko et al. | |
| 2019/0271470 A1* | 9/2019 | Boardman | F23R 3/283 |
| 2020/0158343 A1* | 5/2020 | Boardman | F23R 3/18 |
| 2020/0263873 A1* | 8/2020 | Boardman | F23R 3/286 |
| 2022/0357038 A1* | 11/2022 | Boardman | F23R 3/286 |

\* cited by examiner

GAS TURBINE FUEL MIXER COMPRISING A PLURALITY OF MINI TUBES FOR GENERATING A FUEL-AIR MIXTURE

TECHNICAL FIELD

The preferred embodiments relate to a fuel mixer. More particularly, the preferred embodiments relate to a hydrogen fuel mini mixer with confined tube cluster.

BACKGROUND

Presently, gas turbine engines are not capable of burning high hydrogen fuel blends. Mixers of the gas turbine engines present low-velocity pockets within the mixer that result in flashback (e.g., flame returning to the mixer) and flame-holding issues (e.g., flame within mixer), additionally fuel-air needs to be well mixed before exiting mixer to ensure lower NOx emission.

BRIEF SUMMARY

According to an embodiment, a mixer for blending fuel and air in a combustor of a gas turbine engine, the mixer comprising: a central body having a central passageway and a central axis; a plurality of tubes positioned radially around the central axis and circumferentially around a periphery of the mixer, each of the tubes comprising: a first opening angled with respect to the central axis and configured to introduce a first air flow; a second opening in an opposed relationship with the first opening, the second opening angled with respect to the central axis and configured to introduce a second air flow; a tangential opening at an aft location to the first opening and second opening, the tangential opening angled with respect to the central axis and configured to introduce a tangential air flow; and a cylindrical interior mixing passage configured to receive the first air flow, the second air flow, the tangential air flow, and a fuel flow, wherein the first air flow and the second air flow are configured to spread the fuel flow laterally and the tangential air flow is configured to spread the fuel flow tangentially, and wherein a fuel-air mixture is present at an exit of each of the plurality of tubes.

According to an embodiment, a mixer array for a turbine engine, the mixer array comprising: a plurality of mixers, each mixer having a central body and a plurality of mini tubes positioned circumferentially around the central body, wherein each mini tube of the plurality of mini tubes comprises a cylindrical mixing passage, an opposed air flow generated by air flows through opposing openings in the cylindrical mixing passage, and a tangential air flow generated by air flow through a tangential opening in the cylindrical mixing passage, wherein each mini tube of the plurality of mini tubes is configured to blend a fuel flow with the opposed air flow and the tangential air flow, and wherein the opposed air flow is configured to spread the fuel flow laterally and the tangential air flow is configured to spread the fuel flow tangentially.

According to an embodiment, a method for mixing fuel in a gas turbine engine, the method comprising: injecting a natural gas fuel into the gas turbine engine to initiate operation of the gas turbine engine; after initiating operation, injecting a percentage by volume of hydrogen fuel with the natural gas fuel into a mixer for providing a fuel blend to the gas turbine engine; and ramping up the percentage by volume of hydrogen fuel to the range of 70% to 100% of the fuel blend, wherein the mixer provides opposed air flow and tangential air flow to mix a flow of the fuel blend and to reduce low-velocity pockets in the mixer to reduce emissions.

Additional features, advantages, and embodiments of the preferred embodiments are set forth or apparent from consideration of the following detailed description, drawings and claims. Moreover, it is to be understood that both the foregoing summary of the preferred embodiments and the following detailed description are exemplary and intended to provide further explanation without limiting the scope of the embodiments as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments of the preferred embodiments are discussed in detail below. While specific embodiments are discussed, this is done for illustration purposes only. A person skilled in the relevant art will recognize that other components and configurations may be used without departing from the spirit and scope of the disclosure.

The mixer of the present disclosure is presented in the combustion section of a gas turbine engine. The mixer may blend or mix the fuel and air prior to combustion. The mixer of the present disclosure may also be known as a premixer. The mixer may reduce carbon emissions by allowing burn of pure hydrogen fuel (e.g., 100% hydrogen fuel) or a blend of hydrogen fuel and natural gas (e.g., having a hydrogen percentage between 0% and 100%) through enhanced mixing with little or no low-velocity regions and no flashback conditions. The mixer of the present disclosure provides for a mixer that may blend fuel and air in order to achieve a uniform fuel-air distribution within the mixer and also eliminate regions of low-velocity pockets within the mixer passage. This may allow for burning high H2 fuel while ensuring lower nitrogen oxide emissions.

The mixer of the present disclosure may include a circular tube mixer. The mixer of the present disclosure may include a set of opposed jet flow passages that may cause axially injected fuel introduced between the set of opposed jet flow passages to increase lateral spread. The mixer of the present disclosure may include two tangential holes that may cause the injected fuel to spread tangentially in the tube thereby increasing the fuel-air mixing within the tube. Thus, the mixer of the present disclosure may allow for a cluster of mini tubes where mixing of the fuel occurs with air. This may allow for compartmentalizing the mixer and a more complex flow path, as compared to the prior art, that may improve fuel-air mixing within the tube, may reduce the flame flash back into the mini tubes, and/or may reduce flame-holding within the mini tubes.

Figure 1:
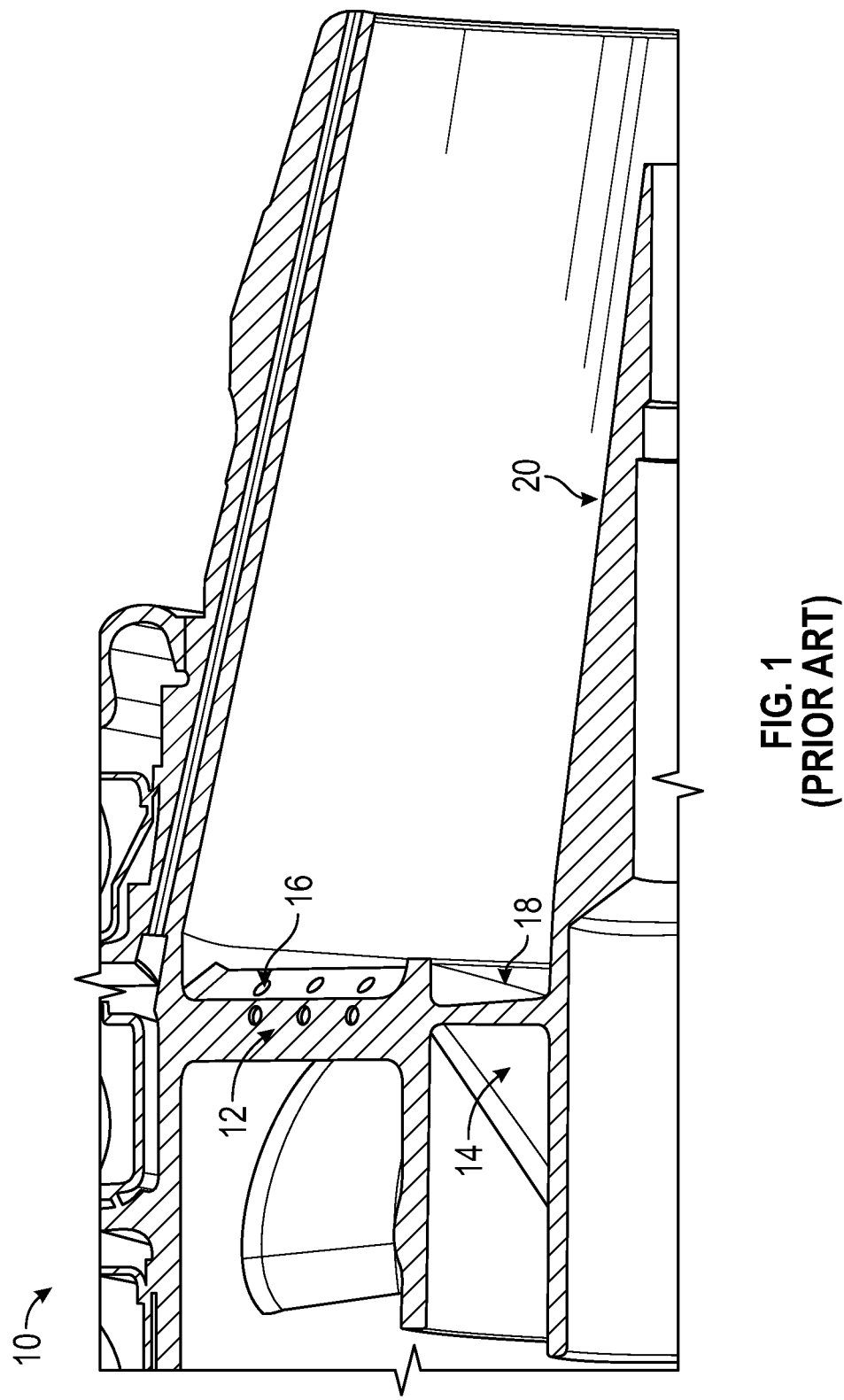
FIG. 1 shows a schematic, cross-section view of a conventional mixer, according to an embodiment of the present disclosure.

Referring to FIG. 1, a cross-section view of a conventional mixer 10 is shown. The mixer 10 may be included in a dry low emission (DLE) engine. The mixer 10 may include an outer vane 12 and an inner vane 14. The outer vane 12 may include one or more openings 16. Fuel may be injected or introduced through the one or more openings 16. The inner vane 14 may include an opening 18. A swirling air flow may be injected or introduced through the opening 18. The swirling air flow from the inner vane 14 may separate on an outer surface of the center body 20. The passageways of the mixer 10 may be annular in cross-section as shown. The arrangement of the mixer 10 is not suitable for hydrogen (H2) fuels as the arrangement results in a re-circulation region on the outer surface of the center body 20 that may increase the flame-holding risk associated with H2 fuels. The length of the mixer 10 may be such that the residence time of the fuel-air mixture within the mixer 10 may result in a high flame-holding risk. The mixer 10 may result in low-velocity zones near the vanes. An arrangement such as the mixer 10 may allow lower % volume of H2 fuel blending in a fuel.

Figure 2A:
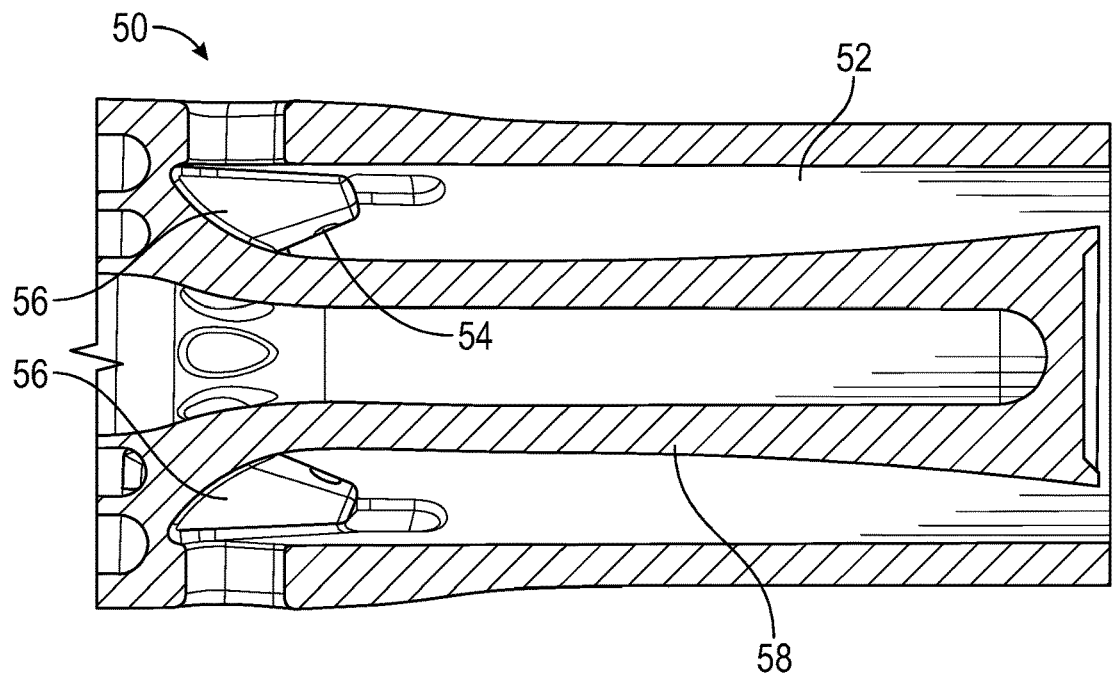
FIG. 2A shows a schematic, cross-section view of a conventional mixer, according to an embodiment of the present disclosure.
Figure 2B:
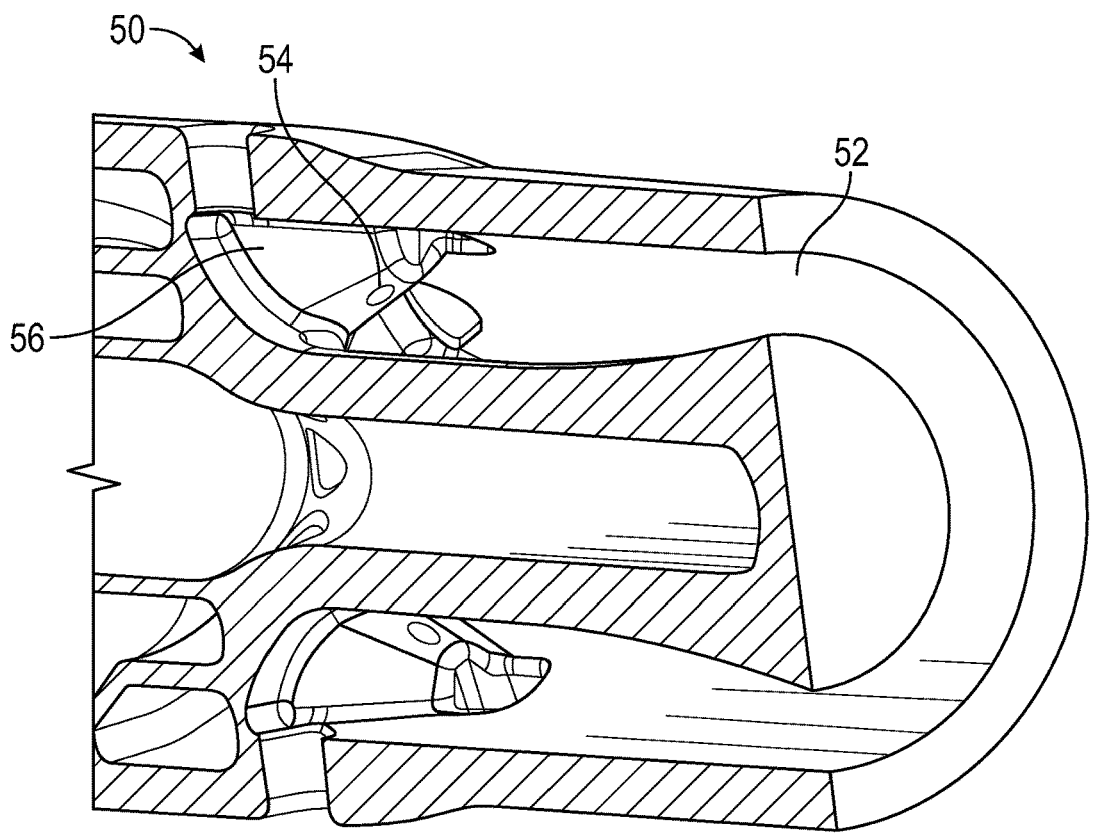
FIG. 2B shows a schematic, perspective cross-section view of the conventional mixer of FIG. 2A, according to an embodiment of the present disclosure.

Referring to FIGS. 2A and 2B, cross-section views of a conventional mixer 50 are shown. The mixer 50 may be included in a DLE engine. The mixer 50 may include an annular mixer passage 52. The fuel may be injected from one or more openings 54 on frustrums 56. The mixer 50 may further include a central bluff body 58. The central bluff body 58 may create an annular mixing passage as shown. The air flow for mixing with the fuel may be provided with a separate air circuit. The mixer 50 may allow higher % volume of H2 fuel blending in a fuel, as compared to the mixer 10. As in the mixer 10, low-velocity zones may exist within the mixer 50.

Figure 3:
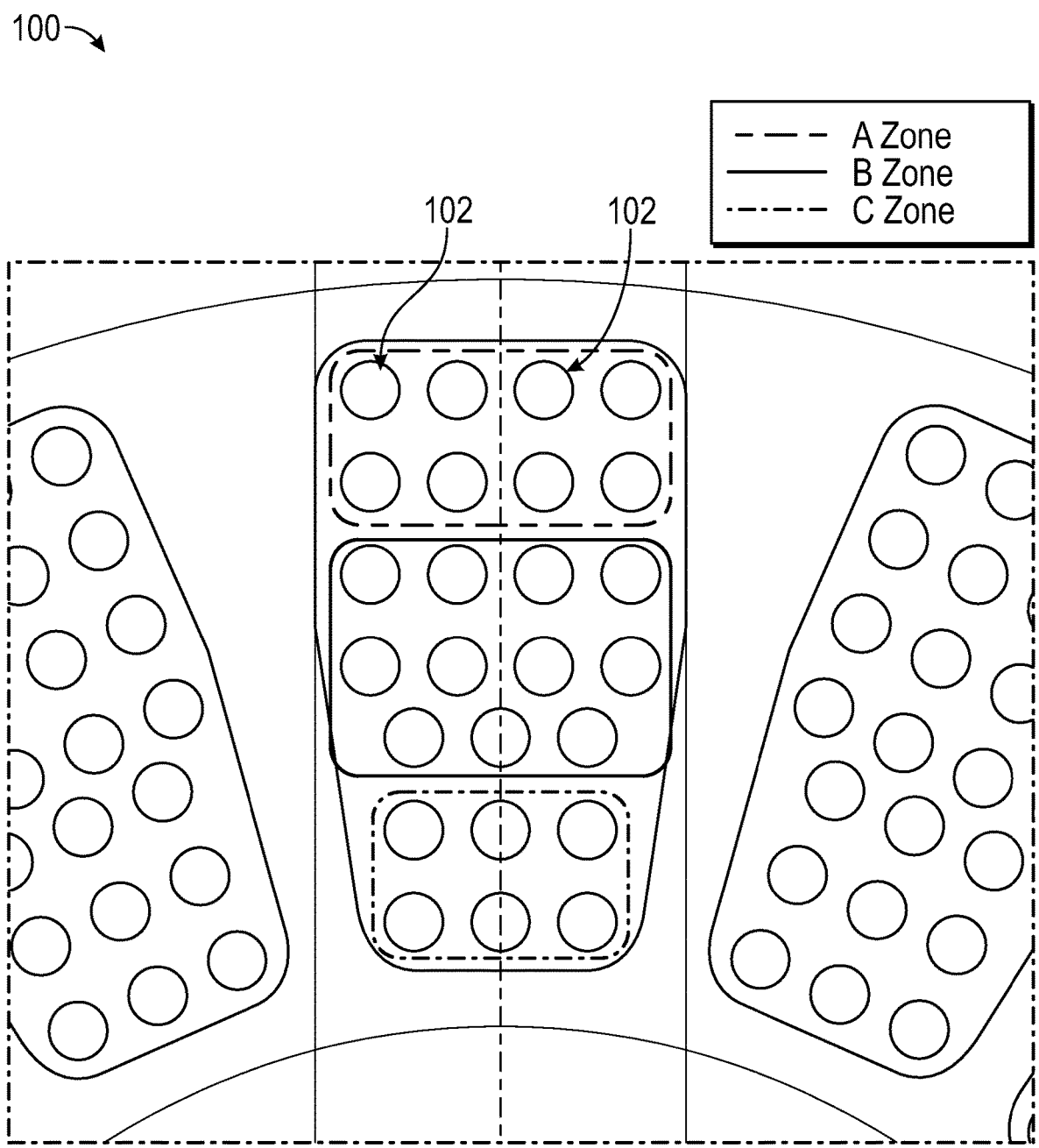
FIG. 3 shows a schematic view of a mixer array, according to an embodiment of the present disclosure.

Referring to FIG. 3, a schematic, perspective view of a mixer array 100 is shown. The mixer array 100 may include one or more mixers 102. The mixer array 100 may be divided into one or more zones. For example, in FIG. 2, the mixer array 100 may be divided into three zones: zone A, zone B, and zone C. The one or more mixers 102 provided in the zones A, B, and C may all be of the same construction, may all be of different construction, or may include some mixers of the same construction and some mixers of different construction.

Figure 4A:
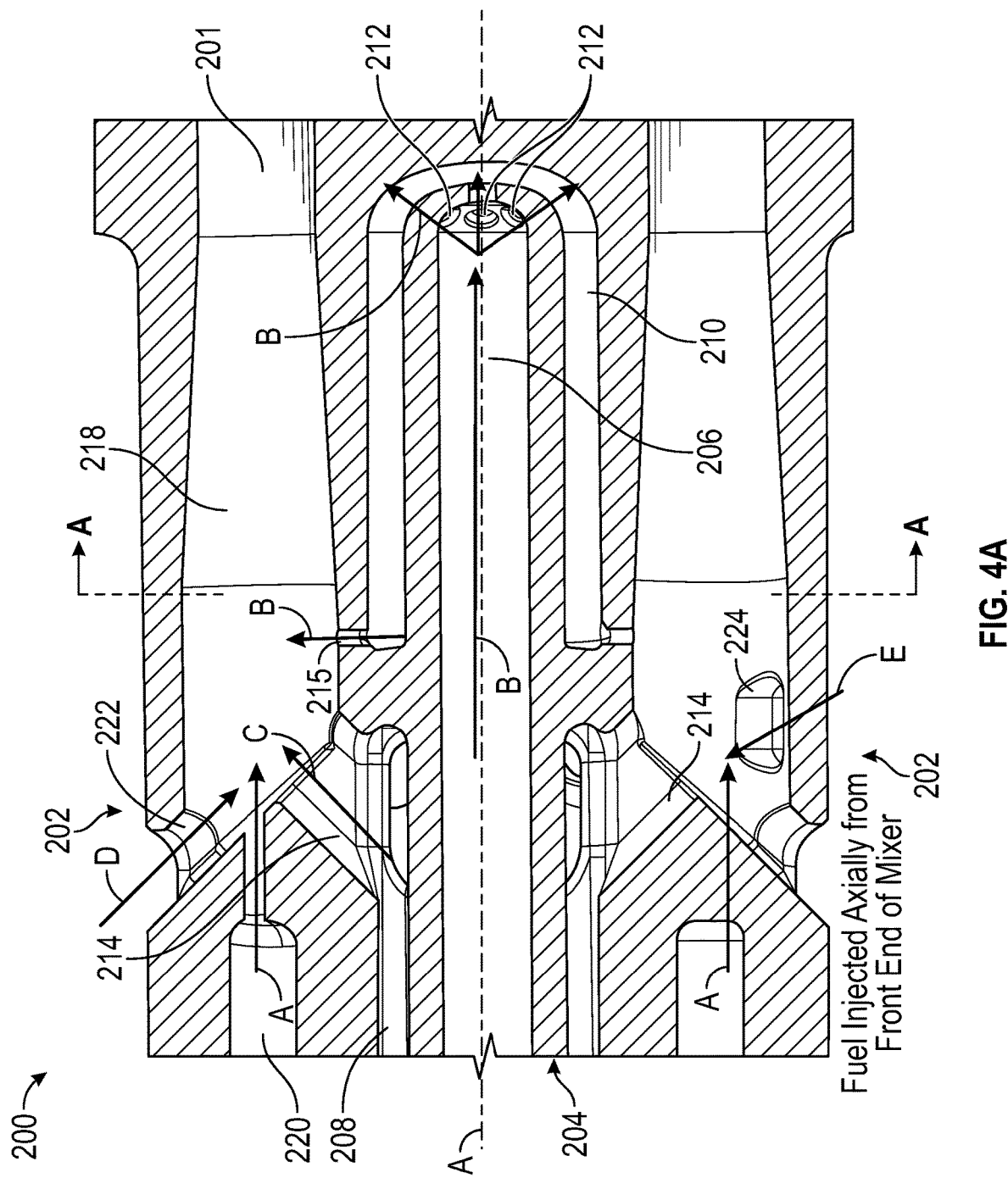
FIG. 4A shows a schematic, cross-section view of a mixer, according to an embodiment of the present disclosure.
Figure 4B:
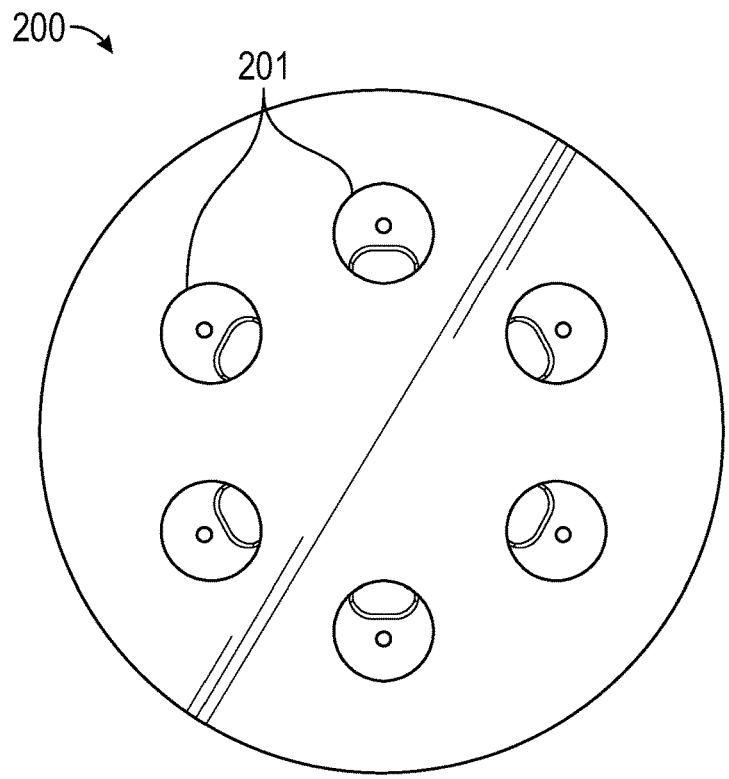
FIG. 4B shows a schematic of an end view of the outlet of the mixer of FIG. 4A, according to an embodiment of the present disclosure.
Figure 4C:
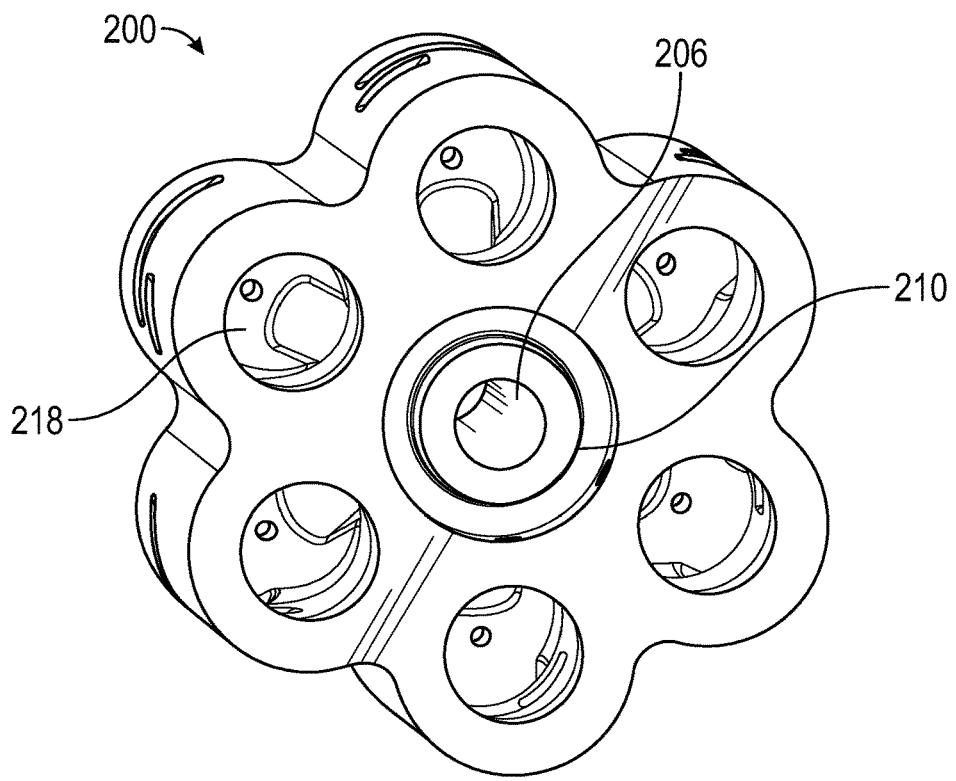
FIG. 4C shows a schematic view taken along the section line A-A of the mixer of FIG. 4A, according to an embodiment of the present disclosure.
Figure 4D:
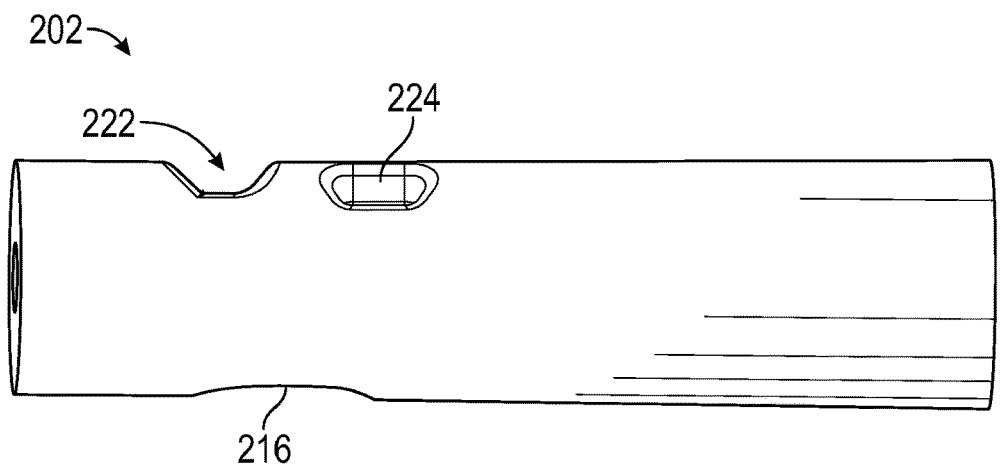
FIG. 4D shows a schematic view of a tube for the mixer of FIG. 4A, according to an embodiment of the present disclosure.

FIGS. 4A-4E show a mixer 200 according to the present disclosure. The mixer 200 may be provided in the mixer array 100 of FIG. 3 (e.g., the mixer 200 may take the place of one or more mixers 102 in the array 100 of FIG. 3). Referring first to FIG. 4A, the mixer 200 may include one or more tubes 202 (e.g., mini tubes) placed along a periphery of the mixer 200. That is, the one or more tubes 202 may be placed circumferentially around a central axis A of the mixer 200. The tubes 202 may represent generally cylindrical mixer passages arranged as small circular tubes. The placement may be uniformly spaced or nonuniformly spaced about the periphery of the mixer 200. The mixer 200 may include a central body 204, also referred to as a central tube 204 having a central passage 206. A first annular passage 208 and a second annular passage 210 may be created between the central tube 204 and the one or more tubes 202. The central tube 204 may include one or more openings 212 that fluidly couple the central passage 206 to the second annular passage 210. One or more passages 214 may fluidly couple the first annular passage 208 to the one or more tubes 202, respectively. The one or more tubes 202 may include an interior passage 218 and opposed openings 222, 216. One or more openings 215 may fluidly couple the second annular passage 210 to the one or more tubes 202. FIG. 4B shows an end view of the exit of the mixer 200. An outlet 201 of each tube 202 may be seen in FIG. 4B. FIG. 4C shows a view of the mixer 200 taken along the section line A-A of FIG. 4A. The fuel-air mixing passage 218, the central passage 206, and the second annular passage 210 are visible in the view of FIG. 4C.

Referring to FIGS. 4D-4G, one tube 202 of the mixer 200 is shown. As mentioned, a plurality of tubes 202 may be placed around the periphery of the mixer 200 (FIG. 4A). Each tube 202 may include the passage 214 that has an opening 216, also referred to as an opposed opening 216, for fluidly coupling the first annular passage 208 (FIG. 4A) with the interior passage 218 also referred to as a fuel-air mixing passage 218 of the tube 202. The interior passage 218 may be circular in cross-section (e.g., generally cylindrical passage as opposed to the generally annular mixing passage of FIGS. 1 and 2). The interior passage 218 may be a fuel-air mixing passage. Each tube 202 may include a fuel passage 220 that may exit into the interior passage 218. Each tube 202 may include an opening 222, also referred to as an opposed opening 222, that opens into the interior passage 218. Each tube 202 may include an opening 224, also referred to as a tangential opening 224, that opens into the interior passage 218.

Referring back to FIG. 4A, fuel flow A may be introduced or injected axially from a front end of the mixer 200 into the one or more fuel passages 220 in the direction of arrow A. The fuel flow A may flow from the fuel passages 220 into the interior passage 218 (FIG. 4D) of the tube 202. Air may be introduced into the mixer 200 in a number of locations. For example, a central air flow B may be introduced in the central passage 206 in the direction of the arrow B. The central air flow B may flow from the central passage 206, through the one or more openings 212, into the second annular passage 210 and exit through the opening 215 into the interior passage 218 of the tube 202. An air flow C may be introduced through the first annular passage 208 and may exit through the passage 214 into the interior passage 218 of the tube 202 in the direction of arrow C. An air flow D, also referred to as an opposed air jet D and opposed air flow D, may be introduced through the opposed opening 222 into the interior passage 218 in the direction of arrow D. An air flow E, also referred to as a tangential air jet E and a tangential air flow E, may be introduced through the tangential opening 224 into the interior of the interior passage 218 in the direction of arrow E.

Figure 4E:
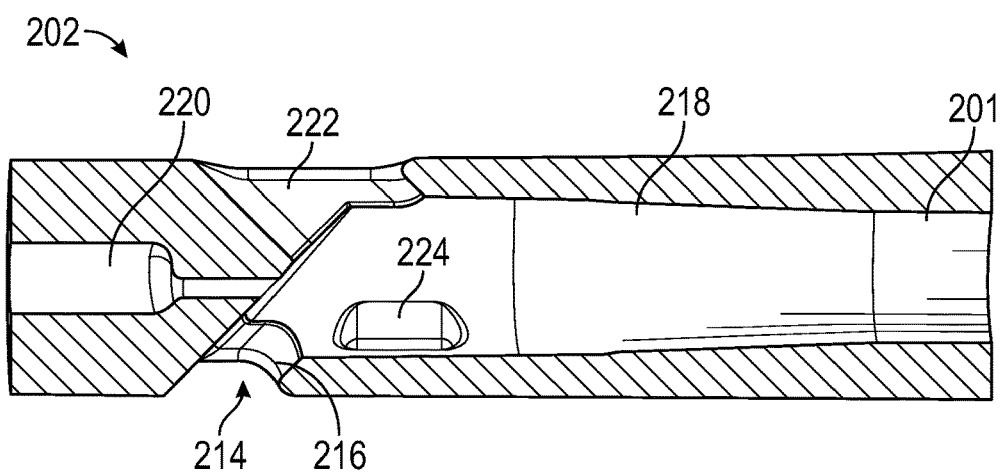
FIG. 4E shows a schematic, cross-section view of the tube of FIG. 4D, according to an embodiment of the present disclosure.
Figure 4F:
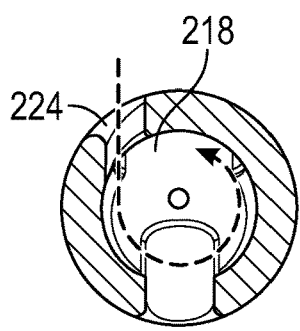
FIG. 4F shows a schematic view of the tube of FIG. 4D taken along the section line B-B having one tangential opening, according to an embodiment of the present disclosure.
Figure 4G:
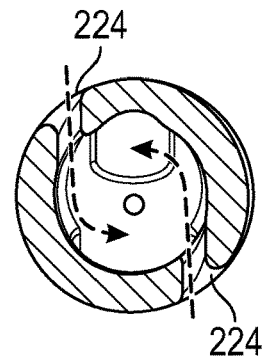
FIG. 4G shows a schematic view of a tube similar to the tube of FIG. 4D and taken along a section line equivalent to B-B having two tangential openings, according to an embodiment of the present disclosure.

The mixer 200 of FIGS. 4A-4G may present an air flow that allows for high velocity flows through the mixer 200. All flows A, B, C, D, and E may converge in the interior passage 218. The first set of opposed jet flow (e.g., flows C and D) may push the fuel flow A into the central area of the interior passage 218 (e.g., may increase the lateral spread of the fuel flow A) and may accelerate the velocity of the fuel flow A. The tangential air flow E may create a tangential flow/velocity that creates jets along the wall (e.g., as shown in FIGS. 4F and 4G) and may cause the fuel flow A to spread tangentially in the interior passage 218 thereby increasing the fuel-air mixing within the tube 202. As shown in FIG. 4E, the tangential opening 224 may be positioned aft of the opposed openings 216 and 222 to clean wakes created behind the jets.

Such an arrangement as shown in FIGS. 4A-4G may prevent or inhibit flame-holding. There may be a single tangential opening 224 (FIG. 4F) or two tangential openings 224 (FIG. 4G) to drive the fuel tangentially. More tangential openings (e.g., three or more) may be contemplated. The tangential air flow may improve air-fuel mixing within the tube 202. The tangential hole(s) may drive the fuel tangentially.

The tangential air flow E may be introduced at any angle (e.g., the angle of tangential openings 224) relative to the opposed openings 222. The included angle of the opposed openings 222 and 216 may be from about 20 degrees to about 170 degrees, or any value or range therebetween. The tangential hole(s) may be positioned aft of the opposed holes. This placement may allow for cleaning of wakes behind the jets from the opposed holes and may generate high velocity near the tube wall, in addition to assisting in mixing of the fuel and air.

Figure 5:
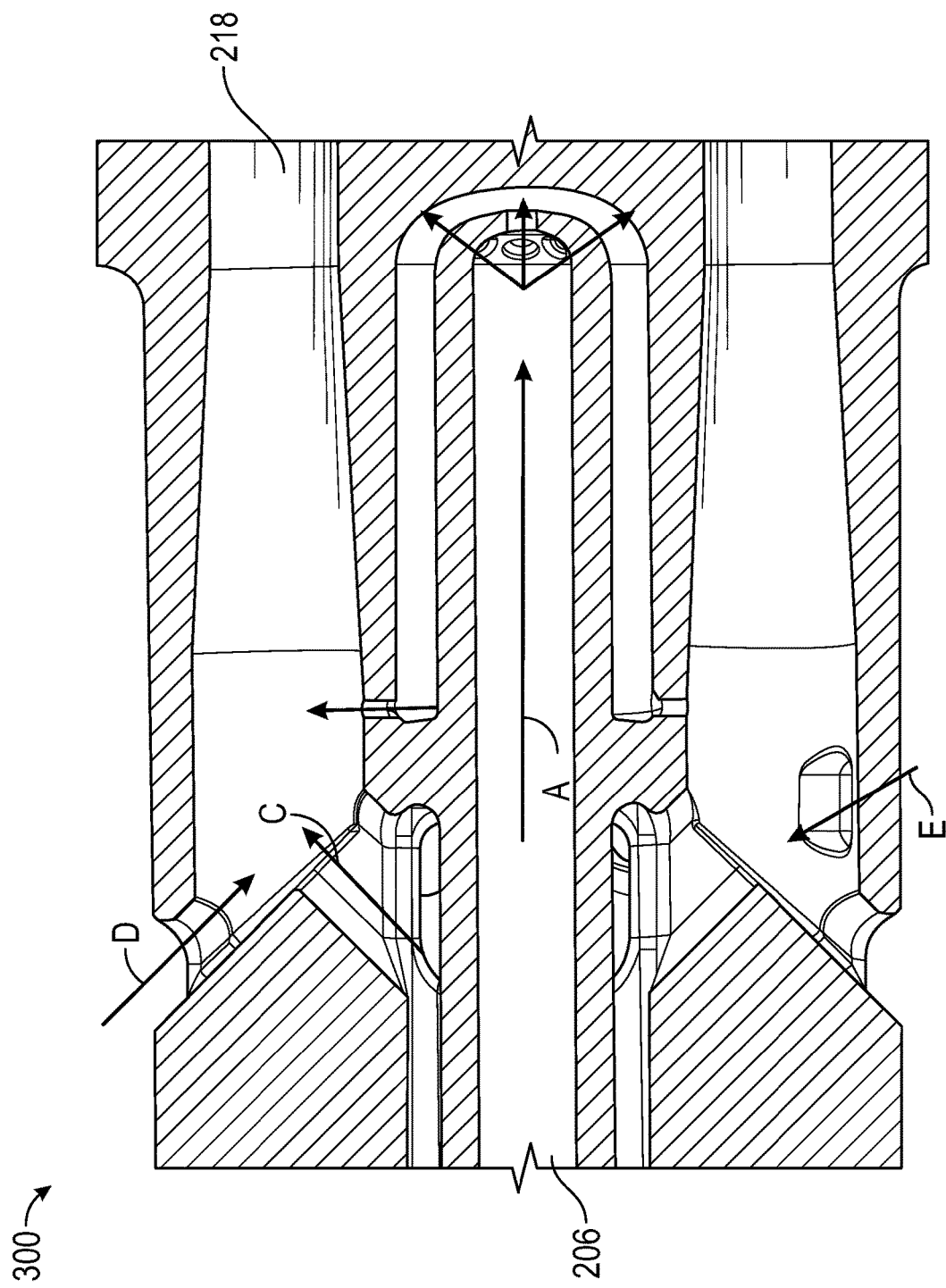
FIG. 5 shows a schematic, cross-section view of a mixer, according to an embodiment of the present disclosure.

Referring to FIG. 5, a mixer 300 is shown. The mixer 300 may be the same or similar to the mixer 200 with the following differences. In the mixer 300, the fuel flow A may be injected or introduced through the central passage 206 and then may be introduced to the interior passage 218 radially. Opposed air flows C and D and tangential air flow E may be presented in the same manner as FIG. 4 and may operate to increase mixing and accelerate the flow as otherwise described herein. Additionally, fuel flow A introduced through the central passage 206 may enable the fuel to be discharged into different mini tube of a given mixer at different axial location which in turn may help to achieve different fuel-air distribution at the exit of the mini tubes of a given mixer. Such an arrangement may abate combustion dynamics.

Figure 6A:
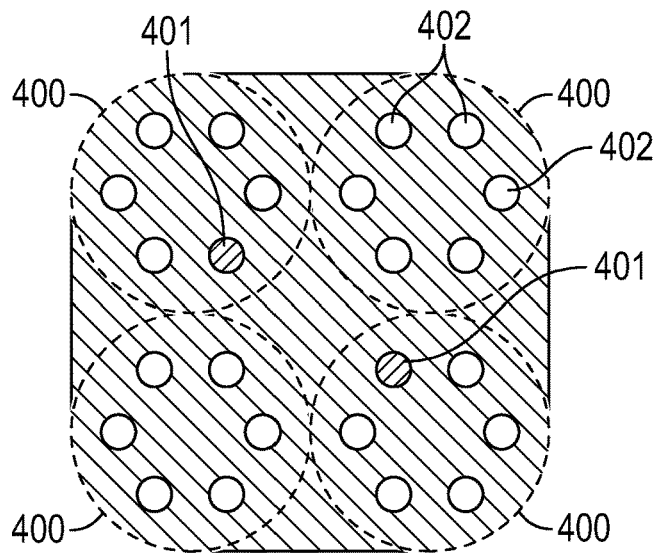
FIG. 6A shows a schematic of an array of mixers, according to an embodiment of the present disclosure.
Figure 6B:
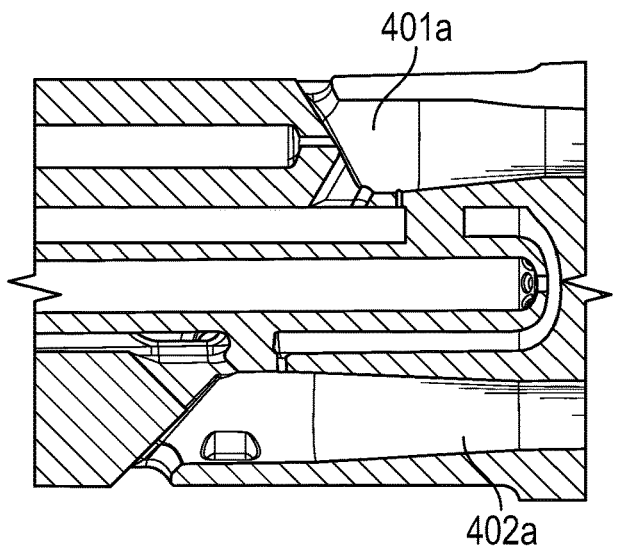
FIG. 6B shows a schematic, cross-section view of a mixer, according to an embodiment of the present disclosure.
Figure 6C:
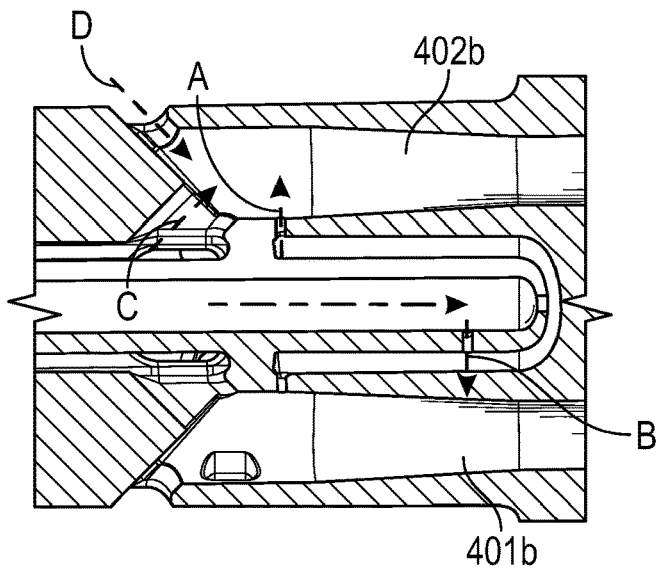
FIG. 6C shows a schematic, cross-section view of a mixer, according to an embodiment of the present disclosure.

Referring to FIGS. 6A-6C, a schematic of an array of mixers 400 is shown. Although four mixers 400 are shown, more or fewer may be provided. The mixers 400 may be the same or similar to other mixers described herein. In the array of mixers 400, one or more pilot tubes 401 and one or more main tubes 402 may be provided. The pilot tubes 401 may introduce the pilot fuel to the engine (e.g., fuel for initiating the engine) and the main tubes 402 may introduce the main fuel to the engine (e.g., fuel for operating the engine). The pilot fuel and the main fuel may be different. The pilot tubes 401 may allow for enhanced operability, lower carbon monoxide emissions, and enhanced turn down capability as compared to embodiments without one or more pilot tubes. The higher fuel-air ratio at the exit of the pilot tube(s) 401 may be achieved by independently controlling fuel flow through pilot circuit, reducing the length of the pilot tube(s) 401, injecting fuel at the aft end of the mixer 400, or any combination thereof. Each mixer may have a fuel injector in the center that may act as a pilot tube. Although two pilot tubes 401 are shown, more or fewer may be provided, including no pilot tubes 401 being provided. Any location of pilot tubes 401 along the periphery of the mixer 400 may be provided. The location and number of pilot tubes 401 may be the same or different in a mixer 400 as compared to other mixers 400 in the array.

Referring to FIG. 6B, the pilot tube 401*a* may be shorter with respect to the main tubes 402*a*. The reduced length of the pilot tube 401*a* as compared to the main tube 402*a* may result in different fuel distribution at the exit of the mixer.

Referring to FIG. 6C, the axial location of fuel injection may be different for the pilot tube 401*b* and the main tube 402*b*. This may change the heat release radially and circumferentially in a manner to influence combustion dynamics. For example, a main fuel may be injected at A at a forward location with respect to the pilot fuel, with may be inject at B at an aft location. Separate fuel supply lines may be provided to control fuel injection independently in the pilot tube 401*a* and the main tube 402*b*. The main tube 402*b* may result in fuel air mixture that is more mixed than the pilot tube 401*b*.

The pilot and main tubes of FIGS. 6B and 6C may be combined, may each be separately provided in the array of FIG. 6A, or only one may be selected to be placed in the arrange of FIG. 6A, or any combination thereof. Opposed air flows C and D and tangential air flow E may also be presented in FIGS. 6B and 6C as previously described herein. Although two pilot tubes 401 are shown in FIG. 6A, any number of pilot tubes may be provided at any location around the periphery of the mixer 400. The size of the openings and tube diameter may be smaller for the pilot tube 401 to control pilot air flow from 2% to 20% of the total premixer flow. The size of each air and fuel opening for each tube may be different to change the fuel-air ratio for different tubes to alter heat release for combustion dynamics improvement.

Figure 7A:
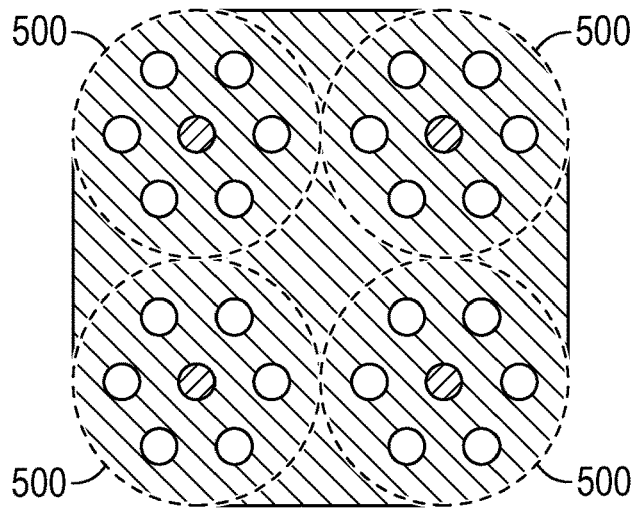
FIG. 7A shows a schematic of an array of mixers, according to an embodiment of the present disclosure.
Figure 7B:
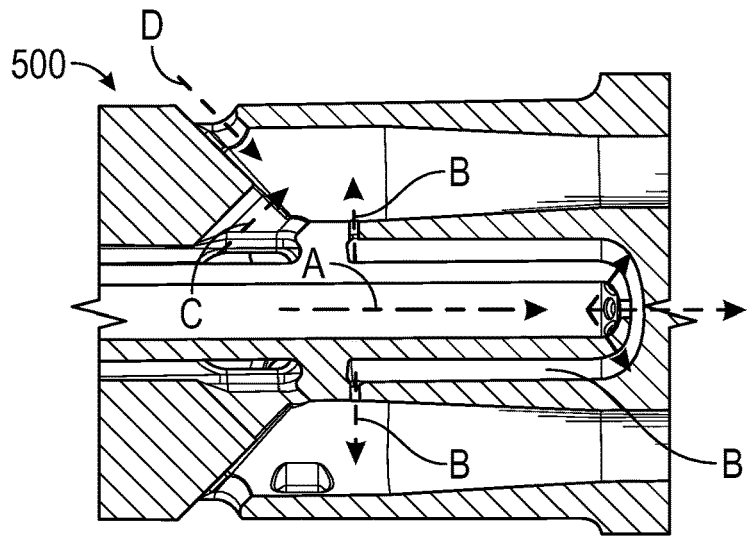
FIG. 7B shows a schematic, cross-section view of a mixer, according to an embodiment of the present disclosure.

Referring to FIGS. 7A and 7B, a schematic of an array of mixers 500 is shown. Although four mixers 500 are shown, more or fewer may be provided. The mixers 500 may be the same or similar to other mixers described herein. Each mixer 500, or one or more of the mixers 500, may include fuel flow A injected in a center of the mixer (e.g., similar to FIG. 5) to act as a pilot. The array of mixers 500 may allow for enhanced operability, lower carbon monoxide emissions, and enhanced turn down capability as compared to mixers not provided with a pilot. Although the mixers 500 are shown to have pilot in the center, alternate locations, such as, for example, but not limited to, a radial location within a given mixer. The location of the pilot may be the same or different for each mixer 500.

Figure 8:
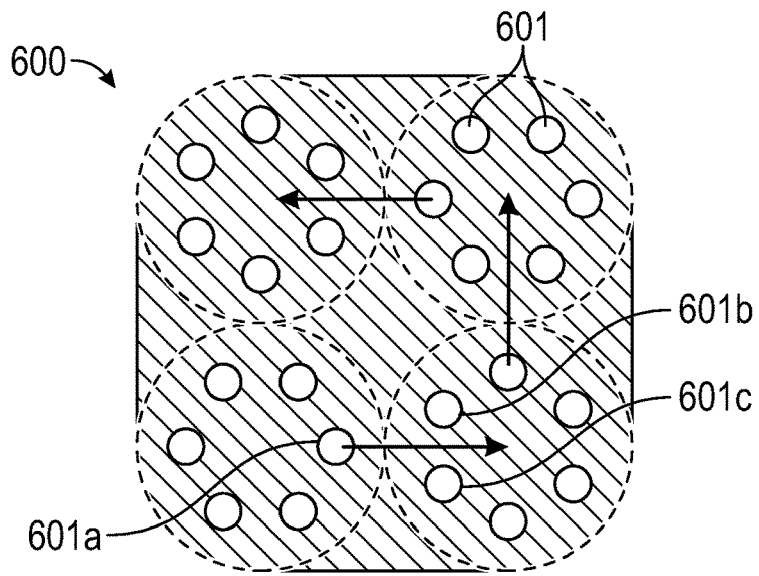
FIG. 8 shows a schematic of an array of mixers, according to an embodiment of the present disclosure.

FIG. 8 shows a schematic of an array of mixers 600. Tubes 601 of the mixer 600 may be staggered with respect to an adjacent mixer. For example, tube 601*a* is out of alignment or staggered with respect to tubes 601*b* and 601*c*. A similar arrangement is shown with respect to the remaining tubes 601. Alternatively, the tubes 601 may be directedly inline (e.g., as shown in FIG. 7A). A staggered alignment may improve emissions.

The mixer 10 of FIG. 1 may include a re-circulation zone on the center body 20 (FIG. 1) where high percentage hydrogen fuel may get trapped. This may result in flame-holding. Thus, the mixer 10 may not be able to burn higher H2 fuel content due to flashback/flame-holding risk.

As mentioned, the fuel may be injected axially near the center of the mixer. Downstream of the first set of jets, the opposed jets may improve the lateral spread of the fuel from the center of the mixer. Downstream of the tangential jet, the tangential jet may improve the tangential spread of the fuel from the center of the mixture. At the mixer exit, there may be uniform fuel distribution within the mixer having a mixedness of fuel with the air of about 97%.

The mixer of the present disclosure creates shorter flame length (as compared to a mixer such as described in FIGS. 1 and 2) and a uniform temperature in the combustor. The flame length is about 50% shorter compared to the flame length in the mixer of FIGS. 1 and 2. The increased mixedness of the fuel and air and the reduction or elimination of low-velocity pockets may result in the shorter flame length, achieve more uniform temperature in the combustor, reduce flashback/flame-holding risk, or any combination thereof.

The mixers of the present disclosure may be a mini mixer having a cluster of minitubes (e.g., a cluster of tubes) having a center axis placed at a radial location with respect to the center of the mixer that is greater than 0.8 times the inner mixer outer diameter. Each of the tubes (e.g., minitubes) may have a cylindrical confinement with a constant area section in the front end and a converging section at the back end. This arrangement may maintain high velocity within the tube. The array of such mixers may form different zones within combustor (e.g., as shown in FIG. 2).

The mixer of the present disclosure may allow for fuel to be injected axially on a slanted or angled surface where the fuel may be blasted by air moving on a slanted or angled surface (e.g., from the tangential hole(s)) and by opposed air (e.g., from the opposing holes). The fuel may also be injected from the center body in constant area section. The mixer of the present disclosure may include a mixer tip having a central region that may be cooled by air, fuel, or a combination thereof, before the same is exhausted into mixer passage.

The mixer of the present disclosure may include multiple small tubes that may generate small compact flames, thereby increasing residence time in the post flame zone that may lower carbon monoxide emissions, as compared to prior art mixers.

The mixer of the present disclosure may be oriented such that tubes on a particular mixer may be directly inline or staggered with respect to the tubes of an adjacent mixer. Such an arrangement may improve emissions.

The mixer of the present disclosure has applications in aero-derivative engines, other gas turbine engines, and applications outside of the gas turbine application. The mixer of the present disclosure may reduce and/or eliminate carbon emissions by allowing burn of varying blends of hydrogen fuel.

The hydrogen fuel percentage may vary from a volume percentage of the fuel blend between 0% to 100%. The hydrogen fuel percentage may vary from a volume percentage of the fuel blend between 10% to 100%. The hydrogen fuel percentage may vary from a volume percentage of the fuel blend between 20% to 100%. The hydrogen fuel percentage may vary from a volume percentage of the fuel blend between 30% to 100%. The hydrogen fuel percentage may vary from a volume percentage of the fuel blend between 40% to 100%. The hydrogen fuel percentage may vary from a volume percentage of the fuel blend between 50% to 100%. The hydrogen fuel percentage may vary from a volume percentage of the fuel blend between 60% to 100%. The hydrogen fuel percentage may vary from a volume percentage of the fuel blend between 70% to 100%. The hydrogen fuel percentage may vary from a volume percentage of the fuel blend between 80% to 100%. The hydrogen fuel percentage may vary from a volume percentage of the fuel blend between 90% to 100%. The hydrogen fuel percentage may vary from a volume percentage of the fuel blend between 55% to 95%. The hydrogen fuel percentage may vary from a volume percentage of the fuel blend between 60% to 90%. The hydrogen fuel percentage may vary from a volume percentage of the fuel blend between 65% to 85%. The hydrogen fuel percentage may vary from a volume percentage of the fuel blend between 70% to 80%. The hydrogen fuel percentage may vary from a volume percentage of the fuel blend between 85% to 100%. The hydrogen fuel percentage may vary from a volume percentage of the fuel blend between 95% to 100%. The hydrogen fuel percentage may vary from a volume percentage of the fuel blend of about 55%, 65%, 70%, 75%, 80%, 85%, 90%, 95%, or 100%. The mixer of the present disclosure may allow for burning of 100% hydrogen fuel in an engine.

The mixer of the present disclosure may allow for burning of natural gas, high hydrocarbon (C2+) fuel, hydrogen, or any combination thereof. The burning of the aforementioned fuels or combinations thereof may lower NOx emissions as compared to prior art mixers. The burning of up to 100% hydrogen fuel capability may allow for zero carbon footprint.

The fuel flow of the present disclosure may represent fuel provided for the engine. The fuel flow may be a pure fuel flow (e.g., pure natural gas, pure hydrogen, etc.) or may be a blended fuel flow (e.g., a percentage by volume of two or more fuels, such as, for example, natural gas and hydrogen). The mixer of the present disclosure may be provided in an engine that may be started with natural gas fuel having no hydrogen fuel mixed therein, then hydrogen fuel may be blended into the natural gas fuel and ramped up to 70%-100% of the fuel mixture at a lower power condition to reduce the carbon monoxide emissions. Then, the hydrogen fuel percentage may be reduced at a higher power condition to about 50% of the fuel mixture to achieve lower nitrogen oxide emissions. The mixer may be operated with 100% hydrogen fuel throughout engine operation (e.g., at low and high-power conditions). The particular fuel blend (e.g., including any percentage of hydrogen from 0% to 100%) may allow for lower NOx and CO emissions.

The mixer of the present disclosure may provide an air-fuel mixture/ratio that may remove auto-ignition, flashback, and flame-holding risk normally associated with a pure premixed burner/mixer design with high hydrogen fuel blends. The mixer of the present disclosure may be presented to generate an arrange of compact and swirled flames.

The mixer of the present disclosure may allow for an aero-derivative, 100% hydrogen fueled, DLE engines. This may allow up to 100% hydrogen capability (zero carbon footprint) for merging with renewables, while requiring little or no water for meeting lower NOx emissions requirements.

Further aspects of the present disclosure are provided by the subject matter of the following clauses.

1. A mixer for blending fuel and air in a combustor of a gas turbine engine, the mixer comprising: a central body having a central passageway and a central axis; a plurality of tubes positioned radially around the central axis and circumferentially around a periphery of the mixer, each of the tubes comprising: a first opening angled with respect to the central axis and configured to introduce a first air flow; a second opening in an opposed relationship with the first opening, the second opening angled with respect to the central axis and configured to introduce a second air flow; a tangential opening at an aft location to the first opening and second opening, the tangential opening angled with respect to the central axis and configured to introduce a tangential air flow; and a cylindrical interior mixing passage configured to receive the first air flow, the second air flow, the tangential air flow, and a fuel flow, wherein the first air flow and the second air flow are configured to spread the fuel flow laterally and the tangential air flow is configured to spread the fuel flow tangentially, and wherein a fuel-air mixture is present at an exit of each of the plurality of tubes.

2. The mixer of any preceding clause, wherein the fuel flow is introduced axially to the cylindrical interior mixing passage along each of the tubes from a forward end of the mixer.

3. The mixer of any preceding clause, wherein the fuel flow is introduced to the cylindrical interior mixing passage at a forward location with respect to the first air flow, the second air flow, and the tangential air flow.

4. The mixer of any preceding clause, further comprising a third air flow introduced through the central passageway, through an annular passage between the central body and the plurality of tubes, and into the cylindrical interior mixing passage.

5. The mixer of any preceding clause, wherein the tangential opening comprises two tangential openings.

6. The mixer of any preceding clause, wherein the fuel flow is introduced axially to the central passageway of the central body from a forward end of the mixer.

7. The mixer of any preceding clause, wherein the fuel flows from the central passageway to an annular passageway formed between the plurality of tubes and the central body and to the cylindrical interior mixing passage.

8. The mixer of any preceding clause, wherein the fuel flow is introduced to the cylindrical interior mixing passage at an aft location to the first air flow, the second air flow, and the tangential air flow.

9. The mixer of any preceding clause, wherein at least one tube of the plurality of tubes is a pilot tube and the remaining tubes of the plurality of tubes are main tubes.

10. The mixer of any preceding clause, wherein the pilot tube comprises a pilot cylindrical interior mixing passage that is shorter in axial length than a main cylindrical interior mixing passage of the main tubes.

11. The mixer of any preceding clause, wherein the fuel flow is introduced to the pilot tube at a forward location in the mixer with respect to the fuel flow introduced into the main tubes.

12. The mixer of any preceding clause, wherein there is no low-velocity region within each of the cylindrical interior mixing passage of the plurality of tubes.

13. A mixer array for a turbine engine, the mixer array comprising: a plurality of mixers, each mixer having a central body and a plurality of mini tubes positioned circumferentially around the central body, wherein each mini tube of the plurality of mini tubes comprises a cylindrical mixing passage, an opposed air flow generated by air flows through opposing openings in the cylindrical mixing passage, and a tangential air flow generated by air flow through a tangential opening in the cylindrical mixing passage, wherein each mini tube of the plurality of mini tubes is configured to blend a fuel flow with the opposed air flow and the tangential air flow, and wherein the opposed air flow is configured to spread the fuel flow laterally and the tangential air flow is configured to spread the fuel flow tangentially.

14. The mixer array of any preceding clause, wherein, in each mixer of the plurality of mixers, the fuel flow is introduced axially to the cylindrical mixing passage of each of the mini tubes from a forward end of the mixer.

15. The mixer array of any preceding clause, wherein, in each mixer of the plurality of mixers, the fuel flow is introduced to the cylindrical mixing passage at a forward location with respect to the opposed air flow and the tangential air flow.

16. The mixer array of any preceding clause, wherein, in each mixer of the plurality of mixers, the fuel flow is introduced axially to the central body from a forward end of the mixer.

17. The mixer array of any preceding clause, wherein, in each mixer of the plurality of mixers, at least one mini tube of the plurality of mini tubes is a pilot tube and the remaining mini tubes of the plurality of mini tubes are main tubes.

18. The mixer array of any preceding clause, wherein a mini tube of a first mixer of the plurality of mixers is directly aligned with a mini tube of a second mixer of the plurality of mixers.

19. The mixer array of any preceding clause, wherein a mini tube of a first mixer of the plurality of mixers is staggered and out of alignment with a mini tube of a second mixer of the plurality of mixers.

20. A method for mixing fuel in a gas turbine engine, the method comprising: injecting a natural gas fuel into the gas turbine engine to initiate operation of the gas turbine engine; after initiating operation, injecting a percentage by volume of hydrogen fuel with the natural gas into a mixer for providing a fuel blend to the gas turbine engine; and ramping up the percentage by volume of hydrogen fuel to the range of 70% to 100% of the fuel blend, wherein the mixer provides opposed air flow and tangential air flow to mix a flow of the fuel blend and to reduce low-velocity pockets in the mixer to reduce emissions.

21. The method of any preceding clause, wherein the opposed air flow is provided from a pair of opposed openings and the tangential air flow is provided from a tangential opening, the pair of opposed openings and the tangential opening each being angled with respect to a central axis of the mixer.

22. The method of any preceding clause, wherein the opposed air flow and the tangential air flow are provided in a cluster of mini tubes provided around a periphery of the mixer.

23. The method of any preceding clause, wherein the tangential air flow is introduced aft to the opposed air flow.

24. The method of any preceding clause, wherein the opposed air flow is configured to spread the flow of the fuel blend laterally and the tangential air flow is configured to spread the flow of the fuel blend tangentially.

Although the foregoing description is directed to the preferred embodiments, it is noted that other variations and modifications will be apparent to those skilled in the art, and may be made without departing from the spirit or scope of the present disclosure. Moreover, features described in connection with one embodiment may be used in conjunction with other embodiments, even if not explicitly stated above.

What is claimed is:

1. A mixer for blending fuel and air in a combustor of a gas turbine engine, the mixer having a forward end and an aft end and comprising:
    a central body having a central passageway and a central longitudinal axis;
    a plurality of tubes positioned radially around the central longitudinal axis and circumferentially around a periphery of the mixer, each of the tubes comprising:
        a first opening angled radially outward with respect to the central longitudinal axis and extending longitudinally in a direction from the forward end to the aft end and configured to introduce a first air flow;
        a second opening in an opposed relationship with the first opening, the second opening angled radially inward with respect to the central longitudinal axis and longitudinally in the direction from the forward end to the aft end and configured to introduce a second air flow;
        a tangential opening at an aft location to the first opening and second opening, the tangential opening angled with respect to the central longitudinal axis and configured to introduce a tangential air flow; and
        a cylindrical interior mixing passage configured to receive the first air flow, the second air flow, the tangential air flow, and a fuel flow,
    wherein the first air flow and the second air flow are configured to spread the fuel flow laterally and the tangential air flow is configured to spread the fuel flow tangentially, and
    wherein a fuel-air mixture is present at an exit of each of the plurality of tubes.

2. The mixer of claim 1, wherein the fuel flow is introduced axially to the cylindrical interior mixing passage along each of the tubes from a forward end of the mixer.

3. The mixer of claim 2, wherein the fuel flow is introduced to the cylindrical interior mixing passage at a forward location with respect to the first air flow, the second air flow, and the tangential air flow.

4. The mixer of claim 1, further comprising a third air flow introduced through the central passageway, through an annular passage between the central body and the plurality of tubes, and into the cylindrical interior mixing passage.

5. The mixer of claim 1, wherein the tangential opening comprises two tangential openings.

6. The mixer of claim 1, wherein the fuel flow is introduced axially to the central passageway of the central body from a forward end of the mixer.

7. The mixer of claim 6, wherein the fuel flows from the central passageway to an annular passageway formed between the plurality of tubes and the central body and to the cylindrical interior mixing passage.

8. The mixer of claim 7, wherein the fuel flow is introduced to the cylindrical interior mixing passage at an aft location to the first air flow, the second air flow, and the tangential air flow.

9. The mixer of claim 1, wherein at least one tube of the plurality of tubes is a pilot tube and the remaining tubes of the plurality of tubes are main tubes.

10. The mixer of claim 9, wherein the pilot tube comprises a pilot cylindrical interior mixing passage that is shorter in axial length than a main cylindrical interior mixing passage of the main tubes.

11. The mixer of claim 9, wherein the fuel flow is introduced to the pilot tube at a forward location in the mixer with respect to the fuel flow introduced into the main tubes.

12. The mixer of claim 1, wherein there is no low-velocity region within each of the cylindrical interior mixing passage of the plurality of tubes.

13. The mixer of claim 1, further comprising:
    a first annular passage located between the central body and the plurality of tubes, the first opening fluidly coupling the first annular passage with the cylindrical interior mixing passage; and
    a second annular passage located between the central body and the plurality of tubes, the second annular passage fluidly coupled between the central body and the cylindrical interior mixing passage.

14. A mixer array for a turbine engine, the mixer array comprising:
    a plurality of mixers, each mixer having a forward end, an aft end, a centerline axis, a central body and a plurality of mini tubes positioned circumferentially around the central body,
    wherein each mini tube of the plurality of mini tubes comprises a cylindrical mixing passage, an opposed air flow generated by air flows through opposing openings in the cylindrical mixing passage, the opposing openings angled in a radial inward direction toward the cylindrical mixing passage and extending in a longitudinal direction from the forward end to the aft end, and a tangential air flow generated by air flow through a tangential opening in the cylindrical mixing passage,
    wherein each mini tube of the plurality of mini tubes comprises an additional air flow or a fuel flow into the cylindrical mixing passage through an opening extending in a radial direction with respect the centerline axis,
    wherein each mini tube of the plurality of mini tubes is configured to blend a fuel flow with the opposed air flow and the tangential air flow, and
    wherein the opposed air flow is configured to spread the fuel flow laterally and the tangential air flow is configured to spread the fuel flow tangentially.

15. The mixer array of claim 14, wherein, in each mixer of the plurality of mixers, the fuel flow is introduced axially to the cylindrical mixing passage of each of the mini tubes from a forward end of the mixer.

16. The mixer array of claim 15, wherein, in each mixer of the plurality of mixers, the fuel flow is introduced to the cylindrical mixing passage at a forward location with respect to the opposed air flow and the tangential air flow.

17. The mixer array of claim 14, wherein, in each mixer of the plurality of mixers, the fuel flow is introduced axially to the central body from a forward end of the mixer.

18. The mixer array of claim 14, wherein, in each mixer of the plurality of mixers, at least one mini tube of the plurality of mini tubes is a pilot tube and the remaining mini tubes of the plurality of mini tubes are main tubes.

19. The mixer array of claim 14, wherein a mini tube of a first mixer of the plurality of mixers is directly aligned with a mini tube of a second mixer of the plurality of mixers.

20. The mixer array of claim 14, wherein a mini tube of a first mixer of the plurality of mixers is staggered and out of alignment with a mini tube of a second mixer of the plurality of mixers.

\* \* \* \* \*